United States Patent
Seo et al.

(10) Patent No.: US 10,185,155 B2
(45) Date of Patent: Jan. 22, 2019

(54) CAMERA ACTUATOR FOR PORTABLE TERMINAL HAVING AUTOFOCUSING AND IMAGE STABILIZATION FUNCTIONS

(71) Applicant: G2HYSONIC CO., LTD., Ansan-si, Gyeonggi-Do (KR)

(72) Inventors: Jong Sik Seo, Ansan-si (KR); Chang Wook Park, Ansan-si (KR); Min Gi Kim, Ansan-si (KR); Yong Kyu Kim, Ansan-si (KR)

(73) Assignee: G2HYSONIC CO., LTD., Ansan-si (KR)

( * ) Notice: Subject to any disclaimer, the term of this patent is extended or adjusted under 35 U.S.C. 154(b) by 0 days.

(21) Appl. No.: 14/779,417

(22) PCT Filed: Aug. 26, 2014

(86) PCT No.: PCT/KR2014/007921
§ 371 (c)(1),
(2) Date: Sep. 23, 2015

(87) PCT Pub. No.: WO2015/046761
PCT Pub. Date: Apr. 2, 2015

(65) Prior Publication Data
US 2016/0202494 A1 Jul. 14, 2016

(30) Foreign Application Priority Data

Sep. 30, 2013 (KR) .................. 10-2013-0115941
Oct. 25, 2013 (KR) .................. 10-2013-0127640

(51) Int. Cl.
*G02B 27/64* (2006.01)
*G02B 7/09* (2006.01)
(Continued)

(52) U.S. Cl.
CPC ............. *G02B 27/646* (2013.01); *G02B 7/09* (2013.01); *G03B 3/10* (2013.01); *G03B 5/00* (2013.01);
(Continued)

(58) Field of Classification Search
CPC . G03B 5/00; G03B 3/10; G03B 13/36; G03B 2205/0007; G03B 2205/0069;
(Continued)

(56) References Cited

U.S. PATENT DOCUMENTS

2012/0063018 A1* 3/2012 Shigemoto ............... G02B 7/08
                                                             359/824
2012/0154614 A1* 6/2012 Moriya .................... G03B 3/10
                                                             348/208.5
(Continued)

FOREIGN PATENT DOCUMENTS

JP      2012037593       2/2012
KR    1019990015638      3/1999
(Continued)

OTHER PUBLICATIONS

International Search Report—PCT/KR2014/007921 dated Jan. 5, 2015.

*Primary Examiner* — Robert E Tallman
(74) *Attorney, Agent, or Firm* — Novick, Kim & Lee, PLLC; Jae Youn Kim

(57) ABSTRACT

A camera actuator having autofocusing and image stabilization functions includes a fixing part mounted on a portable terminal; a first coil mounted on the fixed part; a first carrier installed to be movable in the direction parallel with the lens within the fixing part; a magnet mounted on the first carrier in such a manner that the outside surface of the magnet faces the first coil; a second carrier installed to be movable in the direction of an optical axis of the lens within the first carrier (Continued)

and moving along with the first carrier; a second coil mounted on the second carrier, disposed within the magnet and generating a second driving force to the second carrier; a lens part including at least one lens, mounted on the second carrier, and moving along with the second carrier; and a hall sensor sensing the position of the first carrier.

9 Claims, 13 Drawing Sheets

(51) Int. Cl.
*G03B 13/36* (2006.01)
*H04N 5/225* (2006.01)
*G03B 5/00* (2006.01)
*H02K 41/035* (2006.01)
*H04N 5/232* (2006.01)
*G03B 3/10* (2006.01)
*G03B 29/00* (2006.01)
*H04M 1/02* (2006.01)

(52) U.S. Cl.
CPC ............ *G03B 13/36* (2013.01); *G03B 29/00* (2013.01); *H02K 41/0356* (2013.01); *H04M 1/0264* (2013.01); *H04N 5/2252* (2013.01); *H04N 5/2254* (2013.01); *H04N 5/2257* (2013.01); *H04N 5/23287* (2013.01); *G03B 2205/0007* (2013.01); *G03B 2205/0069* (2013.01)

(58) Field of Classification Search
CPC .... G02B 7/09; H02K 41/0356; H04N 5/2252; H04N 5/2254; H04N 5/2257; H04N 5/23287
USPC ........................................................ 359/557
See application file for complete search history.

(56) References Cited

U.S. PATENT DOCUMENTS

| 2013/0027600 | A1* | 1/2013 | Pavithran | H04N 5/2171 348/335 |
| 2013/0141541 | A1* | 6/2013 | Jung | G03B 35/08 348/46 |
| 2014/0086568 | A1* | 3/2014 | Nomura | G02B 27/646 396/55 |

FOREIGN PATENT DOCUMENTS

| KR | 100824935 | 4/2008 |
| KR | 1020110050161 | 5/2011 |
| KR | 101200711 | 11/2012 |

* cited by examiner

A-A

40a

CAMERA ACTUATOR FOR PORTABLE TERMINAL HAVING AUTOFOCUSING AND IMAGE STABILIZATION FUNCTIONS

TECHNICAL FIELD

The present invention relates to a camera actuator for a portable terminal having auto-focusing and image stabilization functions, and more particularly, to a camera actuator for a portable terminal having auto-focusing and image stabilization functions which may rapidly and precisely control the position of the lens by sensing the position of the lens.

BACKGROUND ART

The multimedia-related technologies of a portable terminal are rapidly developing as a portable terminal such as a smartphone is widespread and the development of new products of a portable terminal continues.

Among the technologies, a portable terminal including a high-resolution and high-performance camera which has an auto-focusing function, an optical zoom function, and so on is more and more popular as the consumer demands for high quality video and taking pictures, and so on grows.

Furthermore, the image stabilization function is added to a portable terminal in order to improve the image quality degradation due to hand tremor.

Disclosed in the Korean Patent Publication no. 10-1200711 is auto-focusing and image stabilization devices for a camera.

FIG. 1 is an exploded perspective view illustrating a compact camera on which conventional auto-focusing and image stabilization devices are mounted and FIG. 2 is a vertical sectional view illustrating a compact camera on which conventional auto-focusing and image stabilization devices are mounted.

The conventional auto-focusing and image stabilization devices includes a first blade 200 mounted within the camera to be movable horizontally and having an outside on which a first coil member 300 is mounted; a second blade 400 having an inside on which a lens is mounted, mounted within the first blade 200 to be moved vertically and having a outside on which a second coil member 500 is mounted; and a magnet 700 mounted within the camera and disposed on the outside of the first blade 200.

Also, a through-hole 211 communicating an inside and the outside of the first blade 200 is formed in the side of the first blade 200, the second coil member 500 is inserted into the through-hole 211 and disposed adjacent to the magnet 700, the first blade 200 horizontally moves along with the second blade 400 due to the interaction of a second electromagnetic field generating when power is applied to the first coil member 300 and the magnetic field generating from the magnet 700 and the second blade 400 vertically moves within the first blade 200 due to the interaction of a second electromagnetic field generating when power is applied to the second coil member 500 and the magnetic field generating from the magnet 700.

Such a conventional auto-focusing and image stabilization devices adjust the focus of the lens or correct the image-shake due to the hand tremor by adjusting the position of the lens when power is applied to the first coil member 300 or the second coil member 500.

However, It is required that the position of the lens is controlled more quickly and accurately in order to take the higher quality image along with improvement of camera function.

DISCLOSURE

Technical Problem

The present invention has been made in an effort to solve the above-described problems, and it is an object of the present invention to provide a camera actuator for a portable terminal having auto-focusing and image stabilization functions being capable of quickly and precisely controlling the position of the lens by sensing the position of the lens driven in order to correct the camera-shake while keeping overall size of the camera compact.

Technical Solution

In an embodiment, a camera actuator having auto-focusing and image stabilization functions which adjust lens focus of a camera or prevent the image-shake by moving the lens of the camera includes a fixing part mounted on a portable terminal; a first coil mounted on the fixed part; a first carrier installed to be movable in the direction parallel with the lens within the fixing part; a magnet mounted on the first carrier in such a manner that the outside surface of the magnet faces the first coil, thereby generating a first driving force to the first carrier when current is applied to the first coil; a second carrier installed to be movable in the direction of an optical axis of the lens within the first carrier and moving along with the first carrier when the first carrier moves by the first drive force; a second coil mounted on the second carrier, disposed within the magnet and generating a second driving force to the second carrier when current is applied to the second coil; a lens part including at least one lens, mounted on the second carrier, and moving along with the second carrier; and a hall sensor sensing the position of the first carrier.

Also, the fixing part includes a body in which the first carrier is movably installed and a circuit board disposed to wrap an outside surface of the body, wherein the first coil is wrapped around a hollow hole and is mounted on an inside surface of the circuit board, and wherein the hall sensor is mounted on the inside surface of the circuit board to be disposed within the hollow hole.

Also, the body has a hexahedral shape and the circuit board is disposed to be wrapped four sides of the body, wherein the first coil includes four parts which are mounted on the circuit board to be corresponded to four sides of the body respectively, wherein the hall sensor comprises a first hall sensor mounted on any side of the four sides of the circuit board on which the first coil is mounted, thereby sensing a first axial position of the first carrier; and a second hall sensor mounted on any other side adjacent to one side of the circuit board on which the first hall sensor is mounted, thereby sensing a second axial position of the first carrier which is perpendicular to the first axial position.

Further, the camera actuator having auto-focusing and image stabilization functions further includes a wire spring having one end mounted on the body and the other end mounted on the first carrier, thereby elastically supporting to be movable the first carrier in the direction parallel with the lens; and an elastic body having one end mounted on the first carrier and the other end mounted on the second carrier, thereby elastically supporting to be movable the second carrier in the direction of an optical axis of the lens.

Also, the first carrier includes an upper carrier and a lower carrier, wherein the magnet is mounted between the upper carrier and the lower carrier to be disposed between the first coil and second coil, thereby forming a magnetic field around the first coil and the second coil.

Further, the camera actuator having auto-focusing and image stabilization functions further includes a filament wire elastically supporting the first carrier to be movable in a direction parallel with the lens; and an elastic part elastically supporting the second carrier to be movable in a direction of an optical axis of the lens, wherein the filament wire is a coil spring which has one end mounted on the fixing part and the other end mounted on the elastic part.

Also, the hall sensor is mounted on the fixing part to be disposed on the lower portion of the magnet, and wherein the hall sensor includes the first hall sensor sensing the first axial position of the first carrier and a second hall sensor sensing the second axial position of the first carrier which is perpendicular to the first axial position, wherein the fixing part has an inserting groove upwardly opened in order for the hall sensor to be inserted.

Further, the camera actuator having auto-focusing and image stabilization functions further includes the circuit board mounted on the fixing part, wherein the circuit board comprises a mounting portion mounted on the fixing part and a circuit portion bended from the mounting portion to wrap the side of the first carrier and having an inside surface which faces the first carrier and on which the first coil is mounted.

Also, the magnet has an inside surface which faces the second coil and which has a concave curved shape in the outward direction, is disposed between the first coil and second coil, thereby forming a magnetic field around the first coil and the second coil.

Also, the magnet includes a first magnetic force portion having surfaces which face the first coil and the second coil and which each surface is polarized to be have different polarities each other; and a second magnetic force portion being positioned at an upper portion and a lower portion of the first magnetic force portion, thereby having a polarity which is opposite to the polarity of the first magnetic force.

Advantageous Effects

A camera actuator for a portable terminal having auto-focusing and image stabilization functions according to the present invention is capable of quickly and precisely controlling the position of the lens by sensing the positions of the lens and the magnet driven along with the first carrier in order to correct the camera-shake while keeping overall size of the camera compact.

Further, since the filament wire is made from a coil spring, the filament wire which elastically supports the first carrier prevents plastic deformation of the filament wire by drop or external impact, thereby improving durability of the camera actuator.

DESCRIPTION OF DRAWINGS

The above and other objects, features and advantages of the present invention will become apparent from the following description of preferred embodiments given in conjunction with the accompanying drawings, in which.

BEST MODE

First Embodiment

Figure 1:
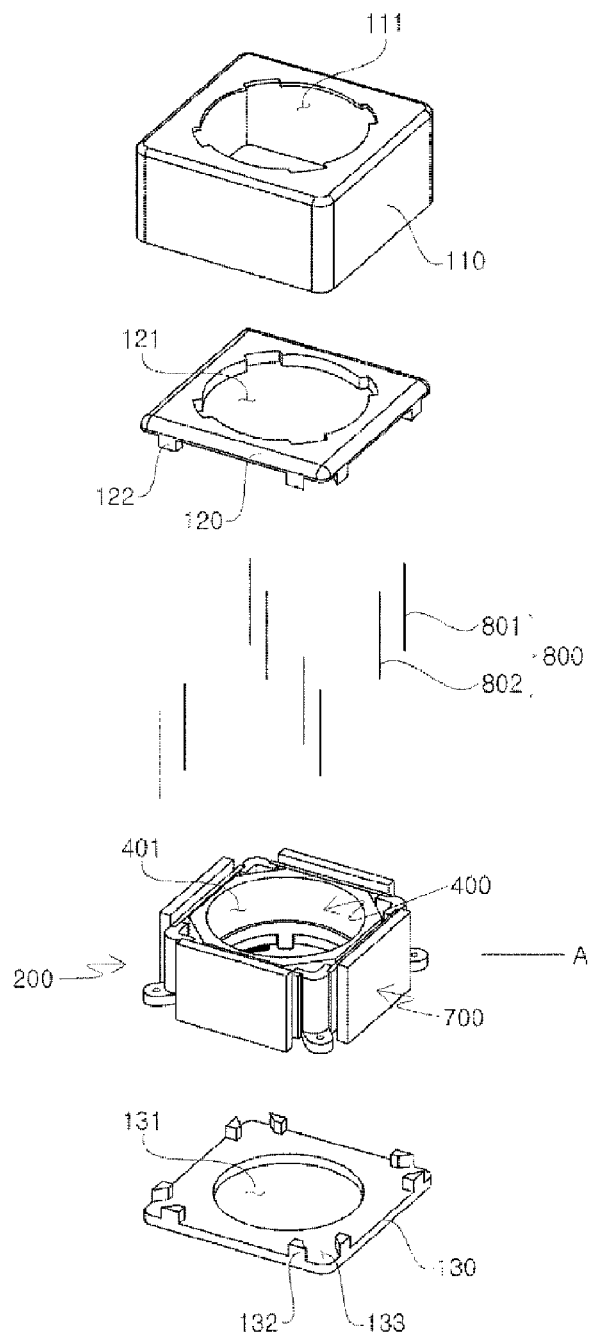
FIG. 1 is an exploded perspective view illustrating a compact camera on which conventional auto-focusing and image stabilization devices are mounted.
Figure 2:
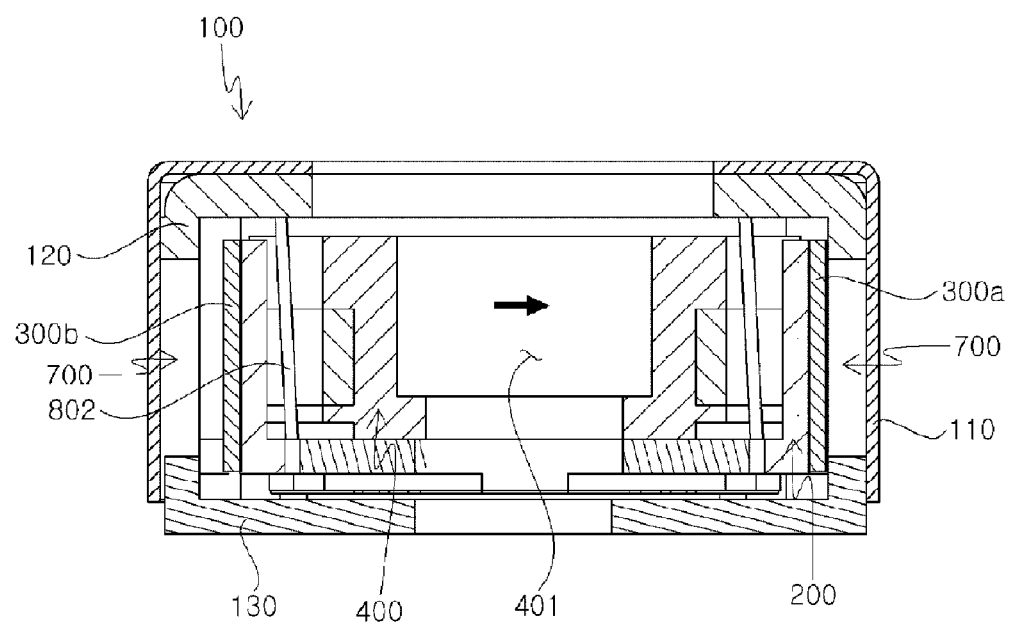
FIG. 2 is a vertical sectional view illustrating a compact camera on which conventional auto-focusing and image stabilization devices are mounted.
Figure 3:
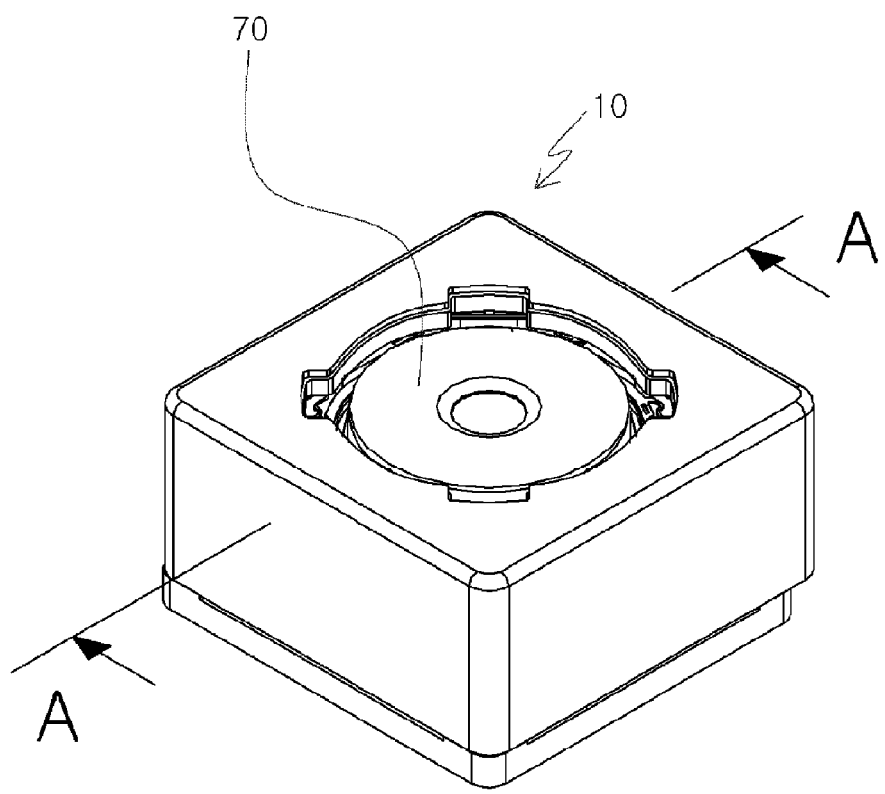
FIG. 3 is a perspective view illustrating the camera actuator for the portable terminal having auto-focusing and image stabilization functions according to a first embodiment of the present invention.
Figure 4:
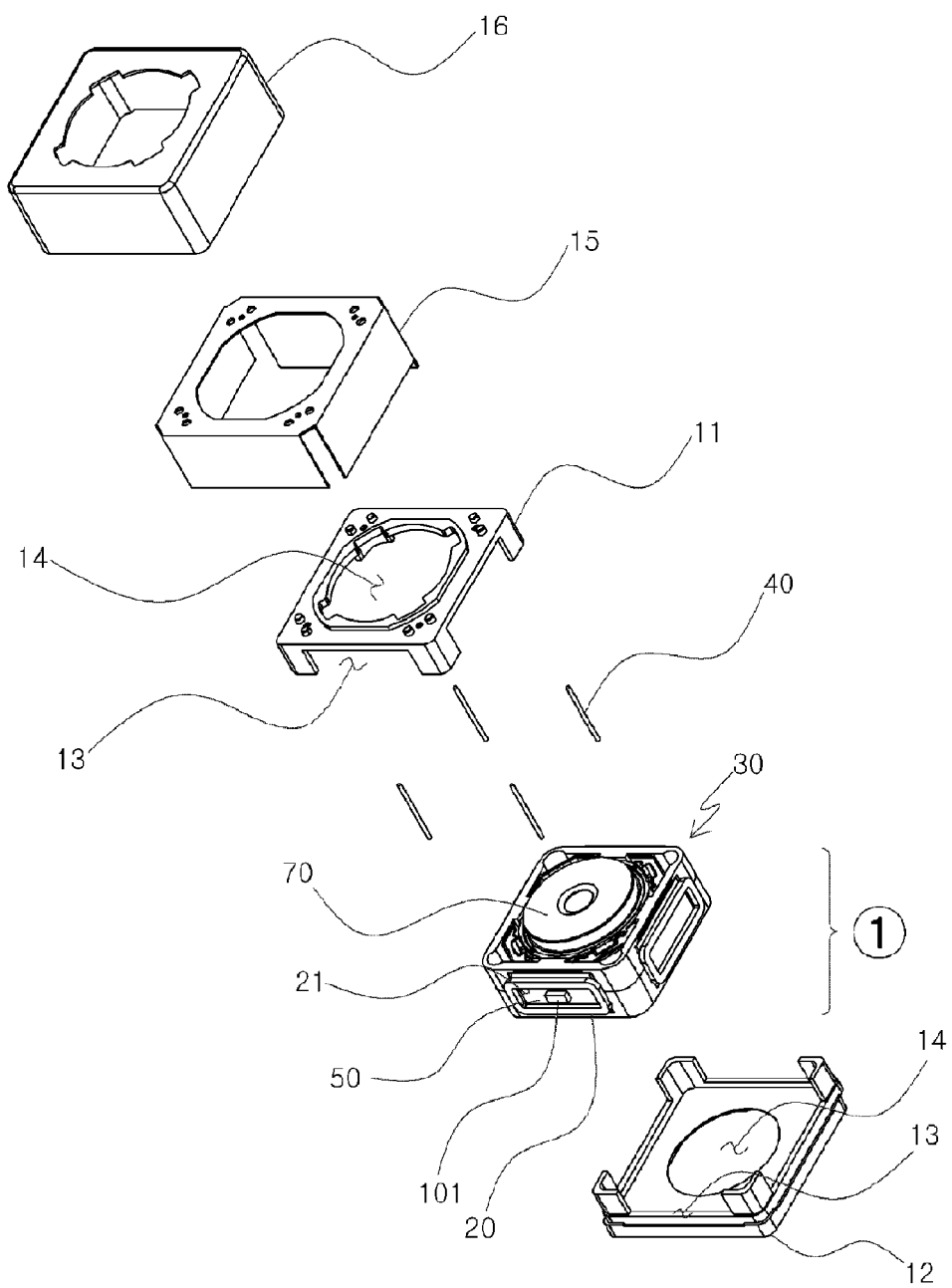
FIG. 4 is an exploded perspective view illustrating the camera actuator for the portable terminal having auto-focusing and image stabilization functions according to the first embodiment of the present invention.
Figure 5:
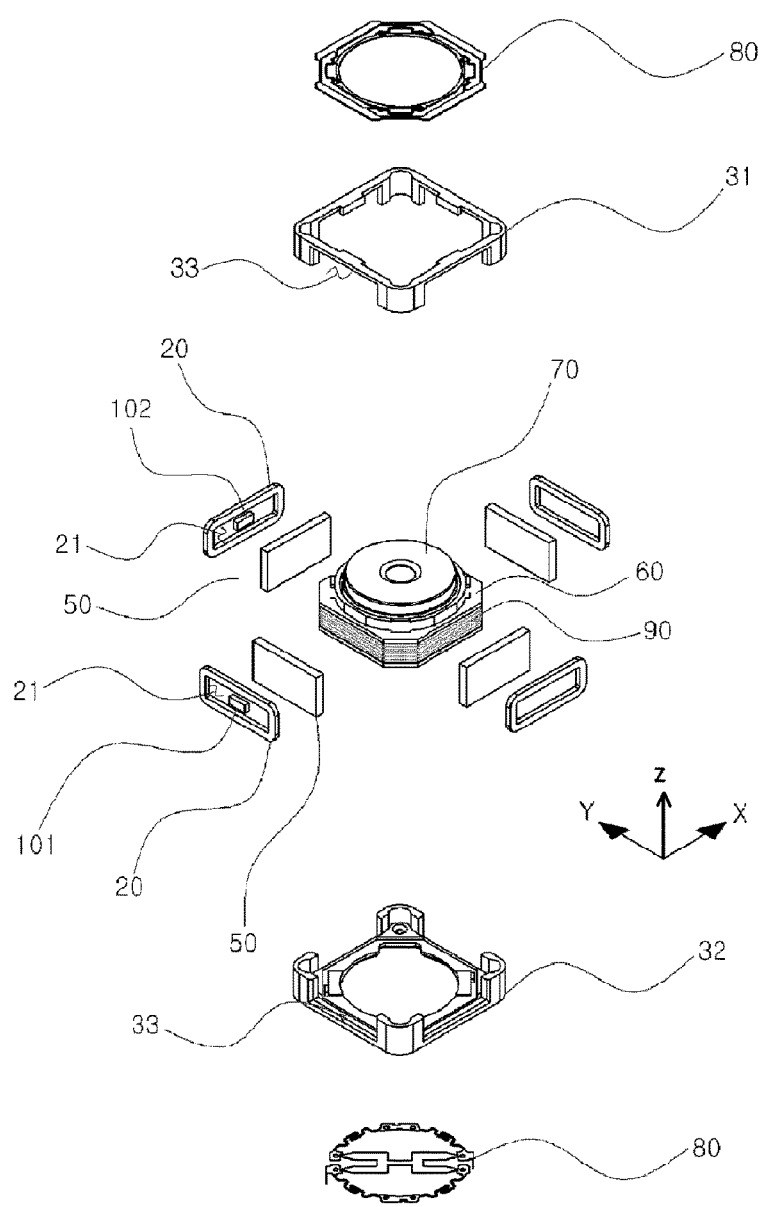
FIG. 5 is an exploded perspective view illustrating $\hat{1}$ portion of the FIG. 4 separately.
Figure 6:
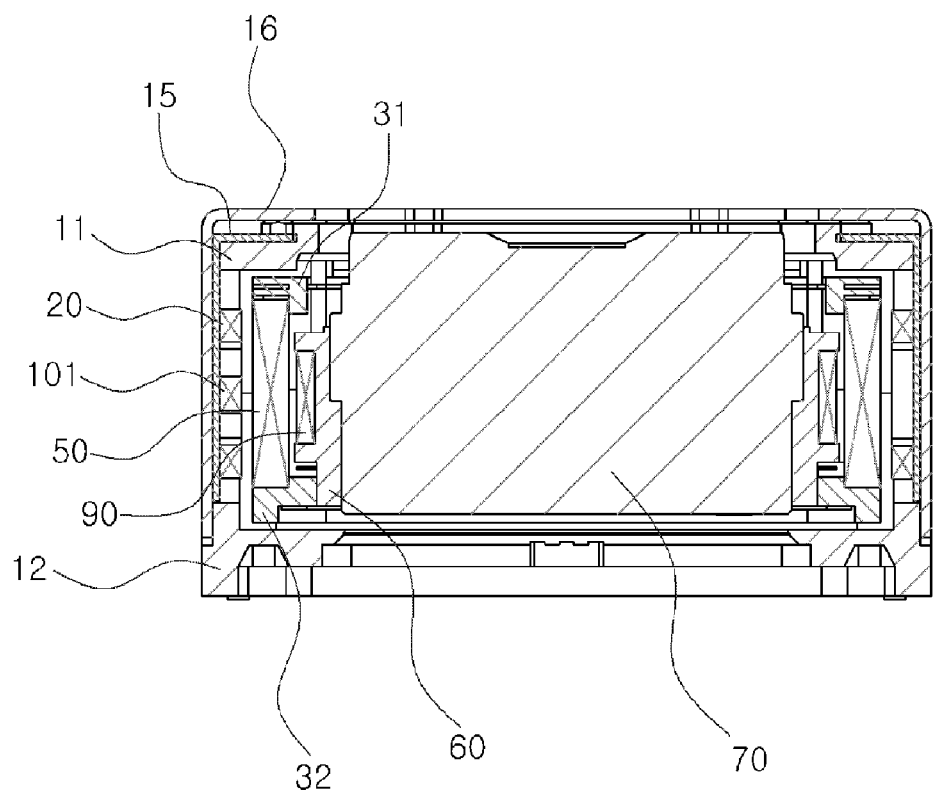
FIG. 6 is a sectional view taken along a line A-A in FIG. 3.
Figure 7:
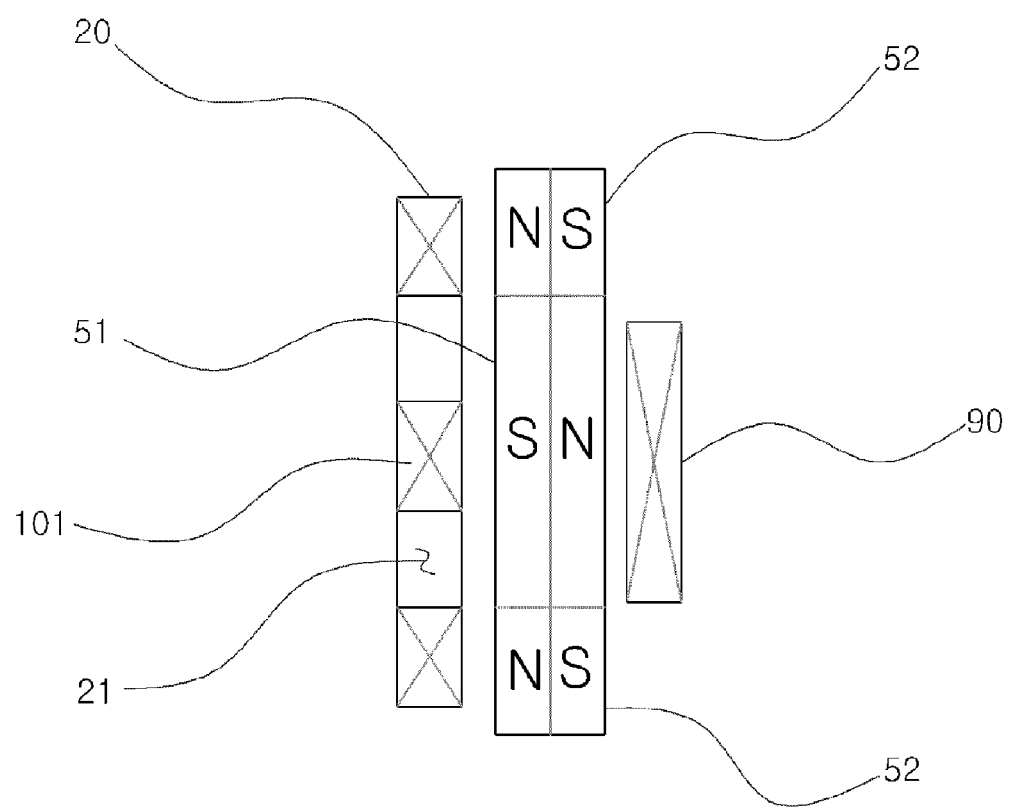
FIG. 7 is a view illustrating a first coil, a magnet, a second coil and a hall sensor separately according to a first embodiment of the present invention.

FIG. 3 is a perspective view illustrating the camera actuator for the portable terminal having auto-focusing and image stabilization functions according to a first embodiment of the present invention, FIG. 4 is an exploded perspective view illustrating the camera actuator for the portable terminal having auto-focusing and image stabilization functions according to the first embodiment of the present invention, FIG. 5 is an exploded perspective view illustrating $\hat{1}$ portion of the FIG. 4 separately, FIG. 6 is a sectional view taken along a line A-A in FIG. 3, and FIG. 7 is a view illustrating a first coil, a magnet, a second coil and a hall sensor separately according to the first embodiment of the present invention.

The camera actuator for the portable terminal having auto-focusing and image stabilization functions According to the first embodiment of the present invention, as illustrated in FIGS. 3 to 7, includes a fixing part 10, a first coil 20, a first carrier 30, a wire spring 40, a magnet 50, a second carrier 60, an elastic body 80, a second coil 90 and a hall sensor.

The fixing part 10 which includes a body, a circuit board 15 and a cover 16 covering the body and the circuit board 15 is mounted on a portable terminal.

As illustrated in the FIGS. 3 and 4, the body has a hexahedral shape and the first carrier 30 is installed to be movable within the body.

Also, the circuit board 15 is disposed on the outside of the body to wrap the four sides of the body.

Specifically, the body divides into a spacer 11 forming the upper portion of the body and a hub 12 forming the lower portion of the body, and a through-hole 13 is formed in the side in which the spacer 11 and the hub 12 vertically contact each other, so that the inside portion in which the first carrier 30 is installed and the outside portion of the body is penetrated.

Also, an open 14 through which the light passes is formed in the upper portion and in the lower portion of the body.

The first coil 20 is mounted on the fixed part 10.

Specifically, the first coil 20 is wrapped about a hollow hole 21, as illustrated in the FIGS. 4 and 5, and is mounted on the inside surface of the circuit board 15.

As such, the first coil 20 mounted on the circuit board 15 is disposed in the through-hole 13 and has the four parts which are positioned on four sides of the body respectively.

The first carrier 30 includes an upper carrier 31 and a lower carrier 32 and is installed within the body to be movable in the direction parallel with the lens by means of a wire spring 40.

As illustrated in FIG. 5, a coupling groove 33 is formed in each of the portions at which the upper carrier 31 and the lower carrier 32 are coupled each other.

The coupling groove 33 is penetrates the inside and the outside of the first carrier 30 and a magnet 50 is mounted in the coupling groove.

The upper end of the wire spring 40 is mounted on the body and the lower end of the wire spring 40 is mounted on the first carrier 30 so that the wire spring elastically supports the first carrier 30 in order for the first carrier 30 to be movable in the direction parallel with the lens.

The magnet 50 is mounted on the first carrier 30 in such a manner that the outside surface of the magnet faces the first coil 20, and when current is applied to the first coil 20 the first driving force is generated in the first carrier 30.

The first driving force, as a force which enables the first carrier 30 to move in the horizontal direction parallel with the lens, corrects the image-shake which is taken by a camera.

As described above, the magnet 50 is mounted in the coupling groove 33 formed between the upper carrier 31 and the lower carrier 32, thereby disposing between the first coil 20 and the second coil 90, as illustrated in FIG. 6.

Also, the magnet 50 enables a lens to move in the vertical direction or in the horizontal direction by an electromagnetic force generating according to application of current to the first coil 20 and the second coil 90 by making magnetic field around the first coil 20 and the second coil 90.

Specifically, as illustrated in FIG. 7, the magnet 50 is divided into a first magnetic force portion 51 and a second magnetic force portion 52, wherein the first magnetic force portion 51 has surfaces which face the first coil 20 and the second coil 90 and each of which is polarized to have different polarity each other, and wherein the second magnetic force portion 52 is positioned in the upper portion and in the lower portion of the first magnetic force portion 51 and has a polarity which is opposite to the polarity of the first magnetic force portion 51.

Such a magnet 50 includes four parts which are disposed to correspond to the first coil 20 respectively.

The second carrier 60 is installed within the first carrier 30 to be movable in the direction of optical axis of the lens and moves along with the first carrier 30 when the first carrier 30 moves by the first driving force.

Also, the first coil 20 is wrapped around the second carrier 60.

The lens part 70 includes at least one lens, is mounted on the second carrier 60 and moves along with the second carrier 60.

The elastic body 80 has one end which is mounted on the first carrier 30 and the other end which is mounted on the second carrier 60, thereby elastically supporting to be movable the second carrier 60 in the direction of the optical axis of the lens.

Further, current applies to the second coil 90 via the elastic body 80.

The second coil 90 is mounted on the second carrier 60, and disposed on the inside of the magnet 50, and capable of generating the second driving force to the second carrier 60 when current applied.

The second driving force, as a force which enables the second carrier 60 to be movable in the vertical direction that is the direction of the optical axis of the lens, adjusts the focus of the lens.

The hall sensor is mounted on the fixing part 10 to face the outside surface of the magnet 50, thereby sensing the position of the second carrier 60.

Also, the hall sensor is mounted on the inside surface of the circuit board 15 to be disposed within the hollow hole 21.

The hall sensor includes a first hall sensor 101 and a second hall sensor 102, as illustrated in FIG. 5.

The first hall sensor 101 is mounted on any side of four sides of the circuit board 15 on which the first coil 20 is mounted, thereby sensing the position of the first axial direction X of the first carrier 30.

The second hall sensor 102 is mounted on any other side adjacent to one side of the circuit board 15 on which the first hall sensor 101 is mounted, thereby sensing the position of the second axial direction Y of the first carrier 30 perpendicular to the first axial direction X.

Specifically, the hall sensor senses the position of the first carrier 30 by sensing the changes in the magnetic field distribution due to the magnet 50.

In other words, when the camera is shaken, once the first carrier 30 on which magnet 50 is mounted moves in the first axial direction X or in the second axial direction Y which is a horizontal direction by applying current to the first coil 20, the relative changes in the position of the hall sensor and magnet 50 is sensed, thereby sensing the position of the first carrier 30 and correcting the positional deviation of the first carrier 30.

As such, the position of the lens may be quickly and precisely controlled by sensing the position of the first carrier 30 driven to correct the camera-shake by means of the hall sensor.

According to this, the image-shake may be treated more quickly and precisely.

Second Embodiment

Figure 8:
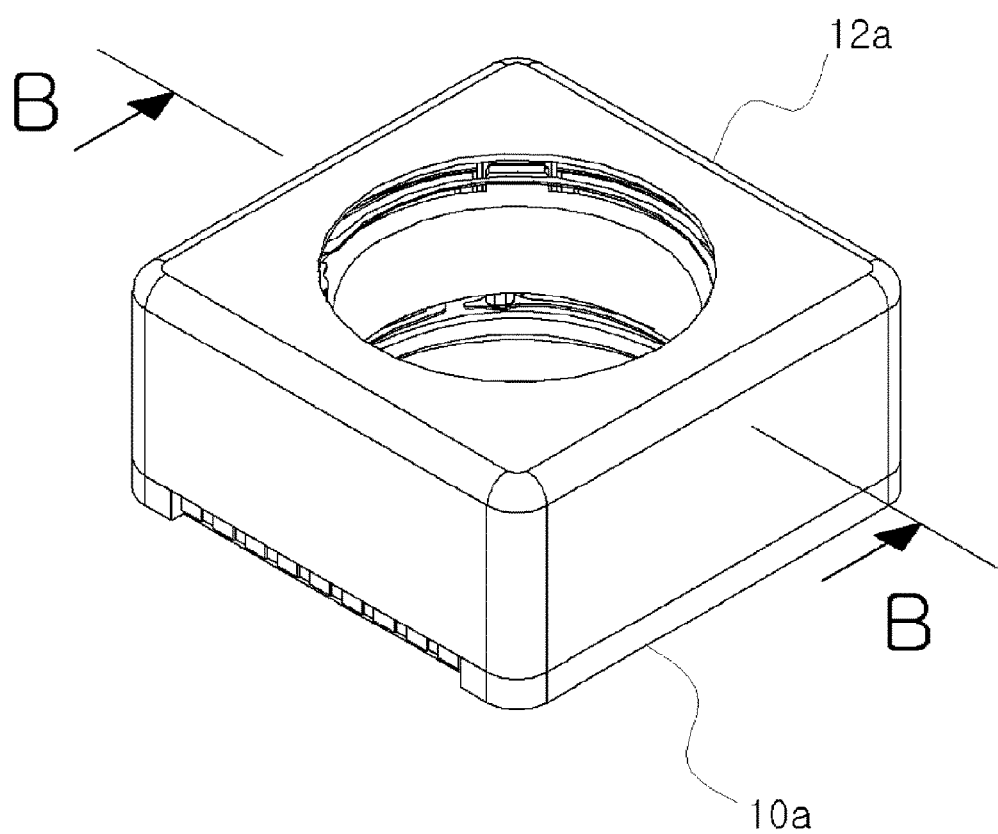
FIG. 8 is a perspective view illustrating the camera actuator for the portable terminal having auto-focusing and image stabilization functions according to a second embodiment of the present invention.
Figure 9:
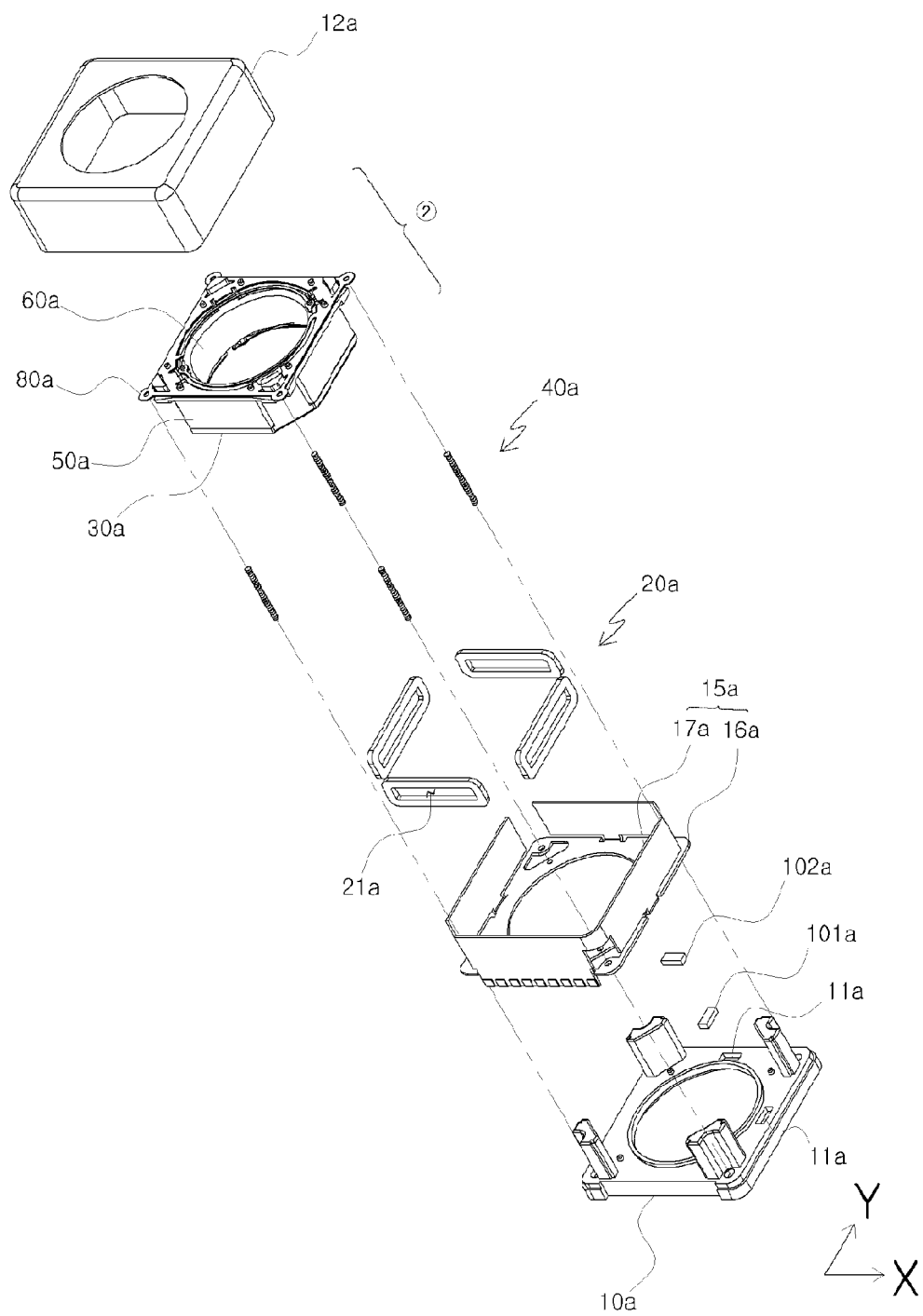
FIG. 9 is an exploded perspective view illustrating the camera actuator for the portable terminal having auto-focusing and image stabilization functions according to the second embodiment of the present invention.
Figure 10:
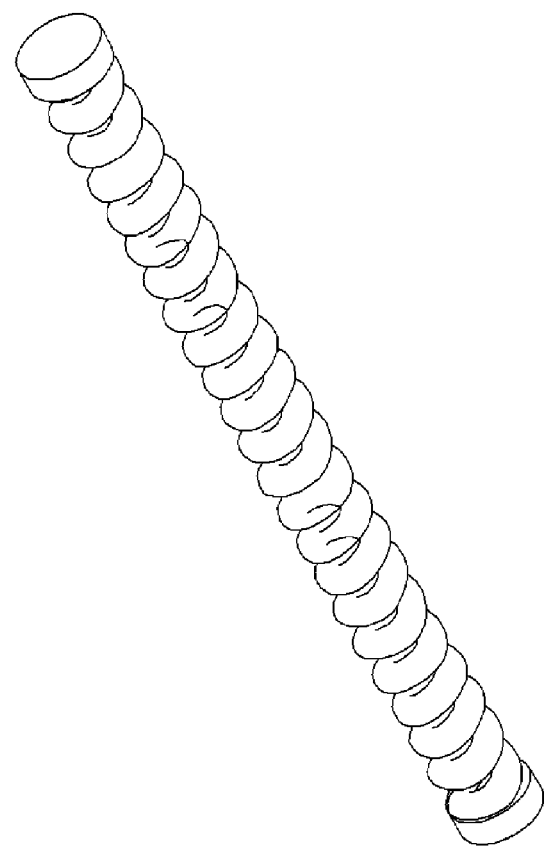
FIG. 10 is a perspective view illustrating a filament wire according to the second embodiment of the present invention.
Figure 11:
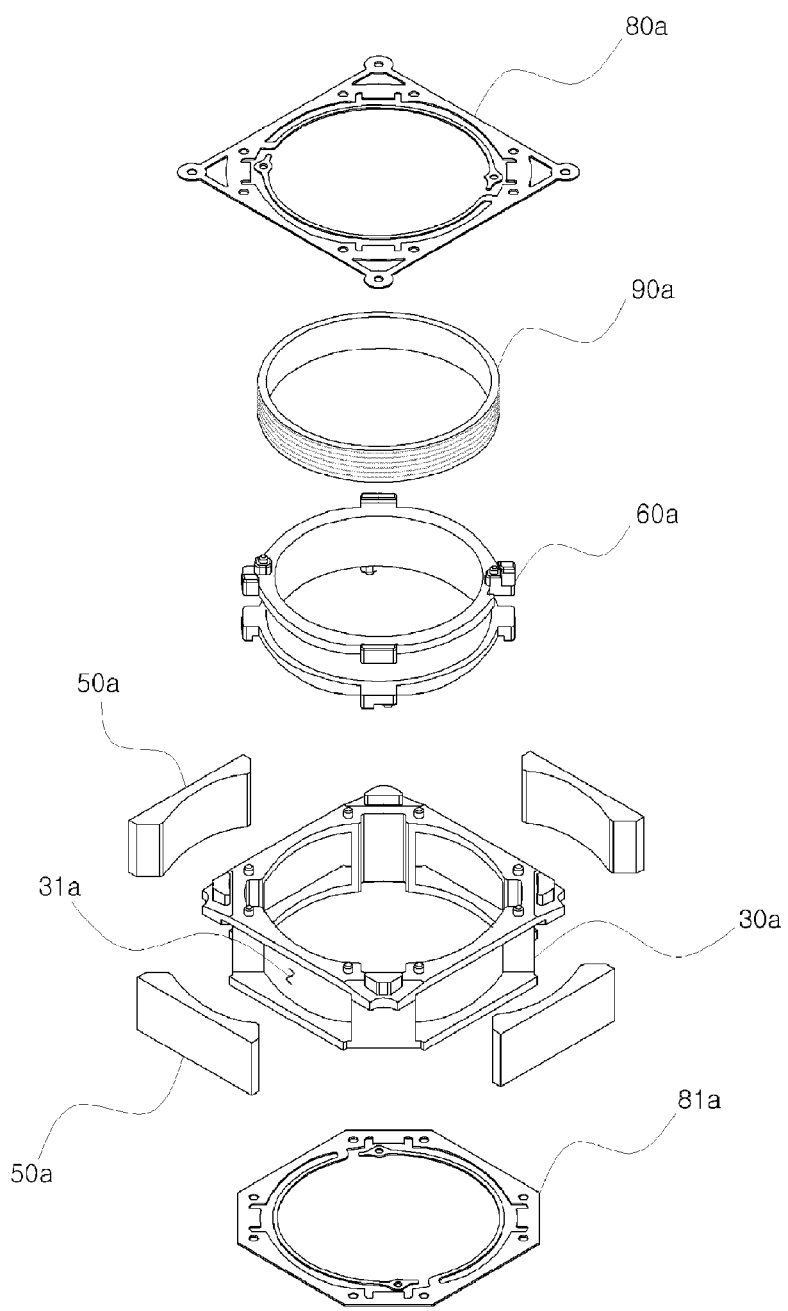
FIG. 11 is an exploded perspective view illustrating $\hat{2}$ portion of the FIG. 9.
Figure 12:
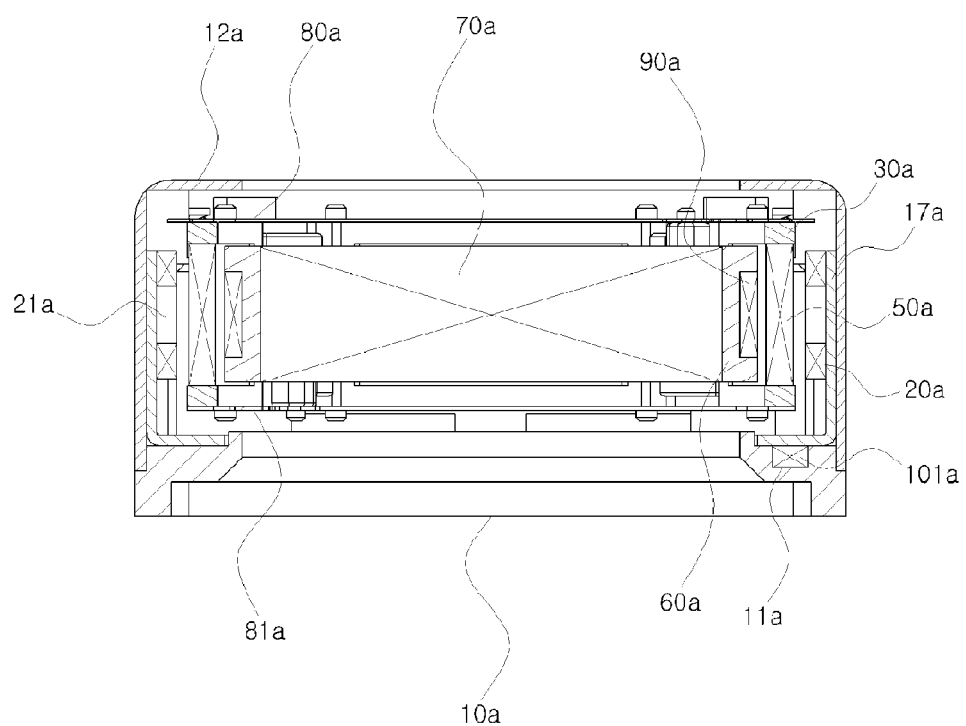
FIG. 12 is a sectional view taken along a line B-B in FIG. 8.
Figure 13:
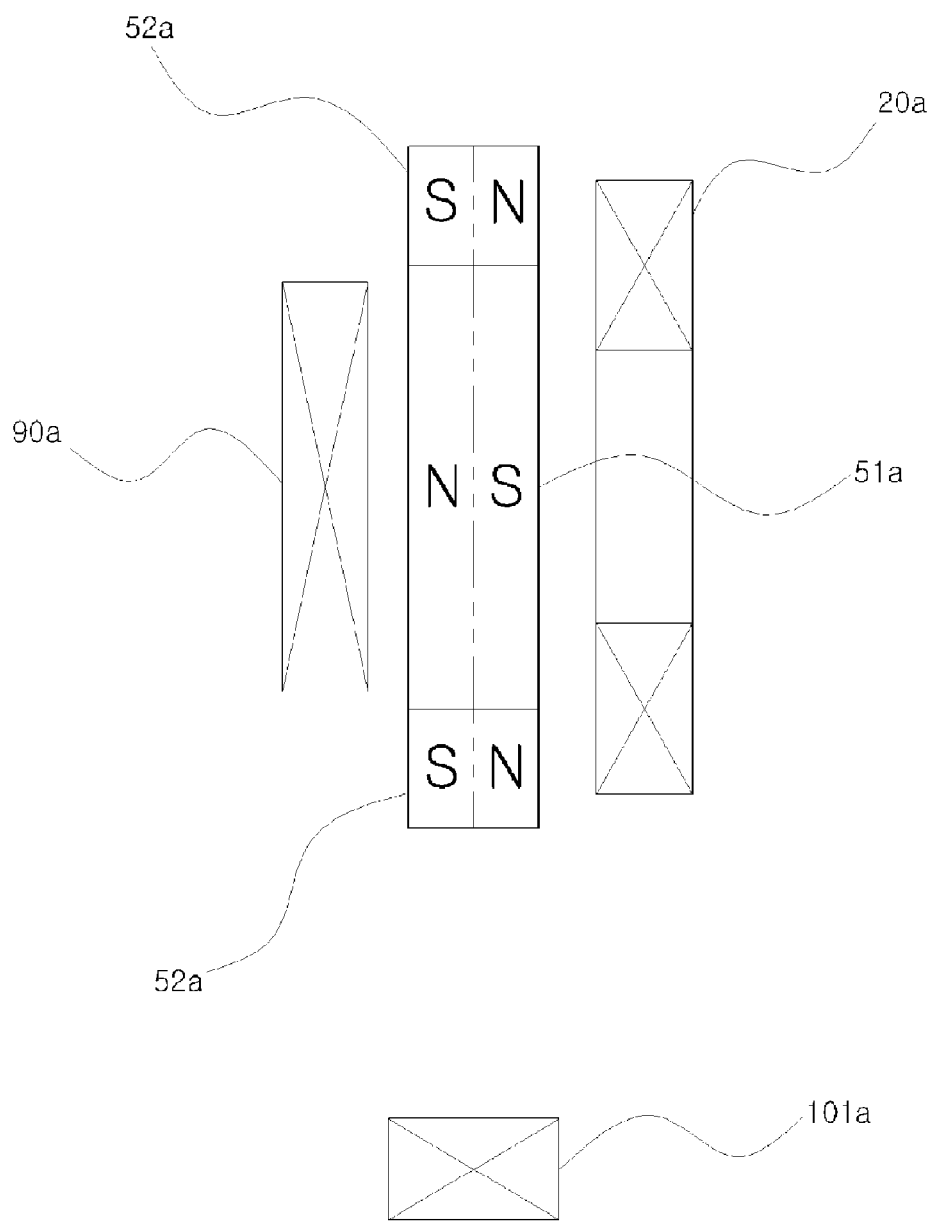
FIG. 13 is a view schematically illustrating a first coil, a magnet, a second coil and a hall sensor according to the second embodiment of the present invention.

FIG. 8 is a perspective view illustrating the camera actuator for the portable terminal having auto-focusing and image stabilization functions according to the second embodiment of the present invention, FIG. 9 is an exploded perspective view illustrating the camera actuator for the portable terminal having auto-focusing and image stabilization functions according to the second embodiment of the present invention, FIG. 10 is a perspective view illustrating a filament wire according to the second embodiment of the present invention, FIG. 11 is an exploded perspective view illustrating 2̂ portion of the FIG. 9, FIG. 12 is a sectional view taken along a line B-B in FIG. 8, and FIG. 13 is a view schematically illustrating a first coil, a magnet, a second coil and a hall sensor according to the second embodiment of the present invention.

The camera actuator for the portable terminal having auto-focusing and image stabilization functions according to the second embodiment of the present invention, as illustrated in FIGS. 8 to 13, includes a fixing part 10a, a circuit board 15a, a first coil 20a, a first carrier 30a, filament wire 40a, a magnet 50a, a second carrier 60a, an elastic part 80a, 81a, a second coil 90a and a hall sensor 101a, 102a.

The fixing part 10a is mounted on the portable terminal and has a upper portion in which the first carrier 30a is movably installed.

As illustrated in the FIGS. 8 and 9, an insertion groove 11a opened upwardly is formed in the upper portion of the fixing part 10a, and a cover 12a is coupled to the upper portion of the fixing part 10a, thereby covering a component installed on the upper portion of the fixing part 10a.

The circuit board 15a on which first coil 20a is mounted is mounted on the fixing part 10a.

The circuit board 15a includes a mounting portion 16a and a circuit portion 17a.

Specifically, the mounting portion 16a is mounted on the upper portion of the fixing part 10a, and the circuit portion 17a is bent from the mounting portion 16a to wrap the side of the first carrier 30a.

Also, the circuit portion 17a has an inside surface which faces the first carrier 30a and on which the first coil 20a is mounted.

The first coil 20a is mounted on the circuit portion 17a, as described above.

Specifically, the first coil 20a is wrapped about a hollow hole 21a, as illustrated in the FIG. 9.

The first coil 20a has four parts which are positioned to correspond to the four side surfaces of the first carrier 30a having a hexahedral shape.

The first carrier 30a is installed to be movable in the direction parallel with the lens at the upper portion of the fixing part by means of the filament wire 40a.

Also, a coupling groove 31a is formed in the first carrier 30a, as illustrated in FIG. 11.

The coupling groove 33 in which the magnet 50a is mounted penetrates the inside and the outside of the first carrier 30a.

The filament wire 40a has a coil spring shape, as illustrated in FIGS. 9 and 10.

Also, the filament wire has a lower end mounted on the fixing part 10a and a upper end mounted on the elastic part so that the filament wire elastically supports the first carrier 30a to enable the first carrier to be movable in the direction of parallel with the lens.

Specifically, the elastic part on which the upper end of the filament wire is mounted is a first elastic part 80a positioned at the upper portions of the first carrier 30a and the second carrier 60a.

As such, since the filament wire which elastically supports the first carrier 30a is made from a coil spring, plastic deformation of the filament wire by drop or external impact is prevented, thereby improving durability of camera actuator.

On the contrary, in case of a wire spring having a general straight shape, the plastic deformation by impact due to drop or other external impact is likely to occur.

The magnet 50a is mounted on the first carrier 30a in such a manner that the outside surface of the magnet faces the first coil 20a and when current is applied to the first coil 20a, the first driving force is generated to the first carrier 30a.

Also, the magnet 50a has an inside surface facing the second coil 90a which has a concave curved shape in the outward direction, as illustrated in FIG. 11.

As such, since the inside of the magnet 50a has a curved shape, the magnet 50a may be positioned closer to the outer peripheral face of the second coil 90a, thereby increasing the strength of the magnet field made around the second coil 90a.

A first driving force, as a force which enables the first carrier 30a to move in the direction of horizontal with the lens, adjusts the position of the first carrier 30a, thereby correcting the image-shake which is taken by a camera.

As described above, the magnet 50a is mounted in the coupling groove 31a and disposed between the first coil 20a and the second coil 90a, as illustrated in FIG. 12.

Also, the magnet 50a enables a lens to move in the vertical direction or in the horizontal direction by an electromagnetic force generating according to application of current to the first coil 20a and the second coil 90a by making magnetic field around the first coil 20a and the second coil 90a.

Specifically, as illustrated in FIG. 13, the magnet 50a is divided into a first magnetic force portion 51a and a second magnetic force portion 52a, wherein the first magnetic force portion 51a has surfaces which face the first coil 20a and the second coil 90a and each of which is polarized to have different polarity each other, and wherein the second magnetic force portion 52a is positioned in the upper portion and in the lower portion of the first magnetic force portion 51a and has a polarity which is opposite to the polarity of the first magnetic force portion 51a.

Such a magnet 50a has four parts which are disposed to correspond to the first coil 20a respectively.

The second carrier 60a is installed to be movable in the direction of the optical axis of the lens within the first carrier 30a and moves along with the first carrier when the first carrier 30a moves by the first driving force.

Also, the second coil 90a is wrapped around the second carrier 60a.

The lens part 70a includes at least one lens and is mounted on the second carrier 60a, thereby moving along with the second carrier 60a.

The elastic part 80a, 81a has one end which is mounted on the first carrier 30a and the other end which is mounted on the second carrier 60a, thereby elastically supporting to be movable the second carrier 60a in the direction of the optical axis of the lens.

The elastic part includes a first elastic part 80a mounted on the upper portions of the first carrier 30a and the second carrier 60a, and a second elastic part 81a mounted on the lower portions of the first carrier 30a and the second carrier 60a.

As described above, the upper end of the filament wire 40a is fixed and mounted on the first elastic part 80a.

The second coil 90a is mounted on the second carrier 60a, and disposed on the inside of the magnet 50a, and capable of generating the second driving force to the second carrier 60a when current is applied.

The second driving force, as a force which enables the second carrier 60a to be movable in the vertical direction that is direction of the optical axis of the lens, adjusts the focus of the lens.

The hall sensor 101a, 102a is inserted and disposed in a insertion groove 11a formed in the fixing part 10a to be disposed in the lower portion of the magnet 50, thereby sensing the position of the second carrier 60a.

The hall sensor includes a first hall sensor 101a and a second hall sensor 102a, as illustrated in FIG. 9.

The first hall sensor 101a senses the position of the first axial direction X of the first carrier 30a and the second hall sensor 102 senses the position of the second axial direction Y of the first carrier 30a perpendicular to the first axial direction X.

Specifically, the hall sensor senses the position of the first carrier 30a by sensing the changes in the magnetic field distribution due to the magnet 50a.

In other words, when the camera is shaken, once the first carrier 30a on which magnet is mounted moves in the first axial direction X or in the second axial direction Y which is a horizontal direction, by applying current to the first coil 20a, the relative changes in the position of the hall sensor and magnet 50a according to changes in the distribution of the magnetic field is sensed, thereby sensing the position of the first carrier 30a and the positional deviation of the first carrier 30a is corrected if required.

As such, the position of the lens may be quickly and precisely controlled by sensing the position of the first carrier 30a driven in order to correct the camera-shake by means of the hall sensor.

According to this, the image-shake may be treated more quickly and precisely.

INDUSTRIAL APPLICABILITY

While the present invention which is a camera actuator for a portable terminal having auto-focusing and image stabilization functions has been described with respect to the specific embodiments, it will be apparent to those skilled in the art that various changes and modifications may be made without departing from the spirit and scope of the invention as defined in the following claims.

The invention claimed is:

1. A camera actuator having auto-focusing and image stabilization functions, comprising:
   a fixing part mounted on a portable terminal;
   a body installed inside the fixing part;
   a first coil mounted on the fixing part;
   a first carrier installed inside the body and configured to move in at least one of an X-direction and a Y-direction within the fixing part, wherein the X-direction is perpendicular to the Y-direction;
   a magnet mounted on the first carrier in such a manner that an outside surface of the magnet faces the first coil and is spaced apart therefrom, thereby generating a first driving force to move the first carrier when current is applied to the first coil;
   a second carrier installed inside the first carrier and configured to move in a Z-direction within the first carrier or to move along with the first carrier moved by the first drive force;
   a second coil mounted on the second carrier in such a manner that the second coil faces an inside surface of the magnet and is spaced apart therefrom, thereby generating a second driving force to move the second carrier when current is applied in the second coil;
   a lens part mounted on the second carrier, the lens part comprising at least one lens and moving along with the second carrier in the Z-direction, wherein the Z-direction corresponds to an optical axis of the at least one lens, and the X-direction and the Y-direction are perpendicular to the Z-direction; and
   a hall sensor sensing a position of the first carrier,
   wherein a circuit board is disposed to wrap a side surface of the body,
   wherein the first coil is disposed to wrap around a hollow hole and is mounted on an inside surface of the circuit board, and
   wherein the hall sensor is mounted on the inside surface of the circuit board to be disposed within the hollow hole.

2. The camera actuator of claim 1, wherein the body has a hexahedral shape and the circuit board is disposed to wrap four sides of the body,
   wherein the first coil comprises four parts mounted on the circuit board, which correspond to the four sides of the body respectively,
   wherein the hall sensor comprises:
   a first hall sensor mounted on one side of the four sides of the circuit board on which the first coil is mounted, thereby sensing a first axial position of the first carrier; and
   a second hall sensor mounted on another side of the four sides of the circuit board, which is adjacent to the one side of the four sides, thereby sensing a second axial position of the first carrier, which is perpendicular to the first axial position.

3. The camera actuator of claim 1, further comprising:
   a wire spring having one end mounted on the body and the other end mounted on the first carrier, thereby elastically supporting the first carrier to be movable in at least one of the X-direction and the Y-direction; and
   an elastic body having one end mounted on the first carrier and another end mounted on the second carrier, thereby supporting the second carrier to be movable in the Z-direction.

4. The camera actuator of claim 1, wherein the first carrier comprises an upper carrier and a lower carrier,
   wherein the magnet is disposed vertically between the upper carrier and the lower carrier and disposed horizontally between the first coil and second coil, thereby forming a magnetic field around the first coil and the second coil.

5. The camera actuator of claim 1, further comprising:
   a filament wire elastically supporting the first carrier to be movable in at least one of the X-direction and the Y-direction; and
   an elastic part supporting the second carrier to be movable in the Z-direction, wherein the filament wire is a coil spring which has one end mounted on the fixing part and the other end mounted on the elastic part.

6. The camera actuator of claim 1, wherein the hall sensor mounted on the fixing part to be disposed on a lower portion of the magnet, and
   wherein the hall sensor comprises:
   a first hall sensor sensing a first axial position of the first carrier and a second hall sensor sensing a second axial position of the first carrier, which is perpendicular to the first axial position,
   wherein the fixing part has an inserting groove upwardly opened for the hall sensor to be inserted.

7. The camera actuator of claim 1, further comprising:
   the circuit board mounted on the fixing part,
   wherein the circuit board comprises:
   a mounting portion mounted on the fixing part; and
   a circuit portion, bended from the mounting portion, having an inside surface which faces the first carrier and on which the first coil is mounted.

8. The camera actuator of claim 1, wherein the magnet comprises a concave curved shave.

9. The camera actuator of claim 1, wherein the magnet comprises:
- a first magnetic force portion attached to a second magnetic force portion;
- at least two sub-portions included in the first magnetic force portion and the second magnetic force portion, respectively; and
- a first coil facing the first magnetic force portion and a second coil facing the second magnetic force portion,
- wherein each sub-portion of the first magnetic portion has a polarity which is opposite to the polarity of each sub-portion of the second magnetic force portion, which is attached to the sub-portion of the first magnetic portion.

\* \* \* \* \*